US011091905B2

(12) United States Patent
Zhao (10) Patent No.: US 11,091,905 B2
(45) Date of Patent: Aug. 17, 2021

(54) SPHERICAL TENT FRAME

(71) Applicant: Zhejiang Garden-Bee Horticulture Technology Co., Ltd., Shangyu (CN)

(72) Inventor: Fujian Zhao, Shangyu (CN)

(73) Assignee: ZHEJIANG GARDEN-BEE HORTICULTURE TECHNOLOGY CO., LTD., Shangyu (CN)

( * ) Notice: Subject to any disclaimer, the term of this patent is extended or adjusted under 35 U.S.C. 154(b) by 190 days.

(21) Appl. No.: 16/235,817

(22) Filed: Dec. 28, 2018

(65) Prior Publication Data
US 2019/0203498 A1 Jul. 4, 2019

(30) Foreign Application Priority Data

Dec. 28, 2017 (CN) .......................... 201721885271.5

(51) Int. Cl.
*E04B 1/19* (2006.01)
*E04B 1/32* (2006.01)
(Continued)

(52) U.S. Cl.
CPC .......... *E04B 1/1903* (2013.01); *E04B 1/3211* (2013.01); *E04H 15/34* (2013.01);
(Continued)

(58) Field of Classification Search
CPC ............. Y10T 403/345; Y10T 403/349; E04B 1/1903; F16B 21/073
See application file for complete search history.

(56) References Cited

U.S. PATENT DOCUMENTS 998,904 A * 7/1911 Jacobs .................... F16L 17/04
285/383
2,609,638 A * 9/1952 Lindenmeyer ....... A63H 33/107
446/126
(Continued)

FOREIGN PATENT DOCUMENTS

CA 2151108 A1 * 12/1996 ............. E04H 15/44

*Primary Examiner* — David R Dunn
*Assistant Examiner* — Danielle Jackson
(74) *Attorney, Agent, or Firm* — Muncy, Geissler, Olds & Lowe, P.C.

(57) ABSTRACT

The present utility model provides a spherical tent frame, comprising a plurality of support rods and a plurality of connecting members, each of the connecting members is provided with at least two connectors and each of the connectors is axially embedded with a socket; wherein an annular groove is provided in a position of the inner wall of the socket close to the bottom, and a plurality of elastic pieces pointing to the center of the bottom of the socket are arranged along the upper edge of the annular groove; both ends of each of the support rods are inserted to the socket to form a hemispherical frame put up with triangles as a unit and the connecting member as a vertex. For the technical solution of this utility model, according to the principle of stability of the triangle, the support rods are set up to a hemispherical frame in a unit of triangle by various multi-head connecting members, with aesthetic appearance, and the frame structure is firm and not easily deformed, and with the elastic pieces in the socket, the support rod is not easily fallen off or loosen from the connecting member after stressed, which assists in enhancing the overall stability of the tent frame and is convenient and quick to install.

9 Claims, 9 Drawing Sheets

(51) Int. Cl.
*F16B 21/07* (2006.01)
*E04H 15/34* (2006.01)
*E04H 15/36* (2006.01)
*E04H 15/44* (2006.01)
*E04H 15/64* (2006.01)

(52) U.S. Cl.
CPC .............. *E04H 15/36* (2013.01); *E04H 15/44* (2013.01); *F16B 21/073* (2013.01); *E04B 2001/3247* (2013.01); *E04H 15/646* (2013.01)

(56) References Cited

U.S. PATENT DOCUMENTS

| | | | | |
|---|---|---|---|---|
| 3,018,858 A * | 1/1962 | Finlayson | ............... | E04H 15/42 52/81.2 |
| 3,877,824 A * | 4/1975 | Jury | ............... | E04B 7/105 403/174 |
| 4,395,154 A * | 7/1983 | Phillips | ............... | E04B 1/3211 403/172 |
| 4,491,437 A * | 1/1985 | Schwartz | ............... | E04B 1/3211 403/172 |
| 4,567,707 A * | 2/1986 | Herman | ............... | A01G 9/16 52/653.1 |
| 6,108,984 A * | 8/2000 | Davidson | ............... | E04B 1/3211 403/171 |
| 7,093,521 B2 * | 8/2006 | Lee | ............... | B25B 23/0021 81/177.2 |
| 7,766,796 B2 * | 8/2010 | Pizmony | ............... | A63B 9/00 482/35 |
| 7,992,353 B2 * | 8/2011 | Athan | ............... | E04B 1/3211 52/81.3 |
| 8,863,447 B2 * | 10/2014 | Bischoff | ............... | E04B 1/3211 52/81.1 |
| 9,328,502 B2 * | 5/2016 | Neville | ............... | A01G 9/1407 |
| 2006/0291952 A1 * | 12/2006 | Wood | ............... | E04B 1/3211 403/217 |
| 2012/0180405 A1 * | 7/2012 | Drake | ............... | E04B 1/3211 52/81.3 |
| 2013/0152486 A1 * | 6/2013 | Hava | ............... | E04B 1/32 52/81.3 |
| 2017/0159280 A1 * | 6/2017 | Nunn | ............... | E04B 1/3211 |
| 2019/0055729 A1 * | 2/2019 | Dietz | ............... | E04B 1/1903 |

* cited by examiner

SPHERICAL TENT FRAME

TECHNICAL FIELD

The present utility model relates to a tent frame, and in particular to a frame for spherical tents.

BACKGROUND

A tent is a temporary building that provides a place for temporary activities, either for field trip or encampment as a temporary shelter or living space. The existing tents are mostly square apex structures, which are simple in the shape and structure, poor in load bearing capacity and difficult to withstand the environment or relatively bad weather conditions, so they are not suitable for people who need to live in the wild for a long time. A spherical tent can avoid these problems because its curved design can disperse the stress well. However, due to the particularity of the curved surface, their stability between the support rods is poor and the installation is difficult, which restricts the development and applications of spherical tents.

SUMMARY

It is an object of the present utility model to overcome the shortcomings of the prior art and to provide a spherical tent frame with good structural stability and convenient installation.

In order to achieve the object, the present utility model adopts the following technical solutions.

A spherical tent frame, comprising a plurality of support rods and a plurality of connecting members, wherein each of the connecting members is provided with at least two connectors and each of the connectors is axially embedded with a socket; wherein an annular groove is provided in a position of the inner wall of the socket close to the bottom, and a plurality of elastic pieces pointing to the center of the bottom of the socket are arranged along the upper edge of the annular groove; both ends of each of the support rods are inserted to the socket to form a hemispherical frame put up with triangles as a unit and the connecting member as a vertex.

Further, the connecting member comprises a regular sir-head connecting member, the regular six-head connecting member comprising a regular hexagonal central base, and the connectors being respectively fixed to each side of the central base and being radially distributed.

Further, the connecting member comprises a regular five-head connecting member, the regular five-head connecting member comprising a regular pentagonal central base, the connectors being respectively fixed to each side of the central base and being radially distributed.

Further, the connecting member comprises a partial five-head connecting member, the partial five-head connecting member comprising a flat polygonal central base, and the connectors being respectively fixed to the side of the central base and being radially distributed; and an angle between a pair of two adjacent connectors being an obtuse angle.

Further, the connecting member comprises a first four-head connecting member, the first four-head connecting member comprises a flat pentagonal central base having two right angles, and the connectors being respectively fixed to the side of the central base and being radially distributed; wherein two of the connectors being respectively located on two parallel faces of the central base and on the same ds and the remaining two connectors being respectively fixed on two inclined faces of the central base.

Further, the connecting member comprises a second four-head connecting member, and the second four-head connecting member comprises a square pentagonal central base, wherein two of the connectors being respectively located on two parallel sides of the central base and on the same axis, and the remaining two connectors being located on the top surface of the central base.

Further, the connecting member comprises a regular three-head connecting member; the three connectors of the regular three-head connecting member are connected to each other in a T-shape as a whole.

Further, the connecting member comprises a partial three-head connecting member, the partial three-head connecting member comprises a flat pentagonal central base having two right angles, and the connectors being respectively fixed to the side of the central base and being radially distributed; wherein two of the connectors being respectively located on two parallel faces of the central base and on the same axis, and the remaining one connector being on one of the inclined faces of the central base such that the entire three-terminal connecting piece is in a beveled triangle shape.

Further, the connecting member comprises a two-head connecting member, the two connectors of the two-head connecting member being coaxially connected to each other in a straight line.

Further, an opening of the frame is in a shape of arcuate arch or apex square.

For the technical solution of this utility model, according to the principle of stability of the triangle, the support rods are set up to a hemispherical frame in a unit of triangle by various multi-head connecting members, with aesthetic appearance, and the frame structure is firm and not easily deformed, and with the elastic pieces in the socket, the support rod is not easily fallen off or loosen from the connecting member after stressed, which assists in enhancing the overall stability of the tent frame and is convenient and quick to install; in addition, various support rods are relatively independent, without interference each other, and the overall tent frame will not be damaged once an individual support rod is damaged.

DETAILED DESCRIPTION

The present utility model is further described in combination with the drawings.

Figure 1:
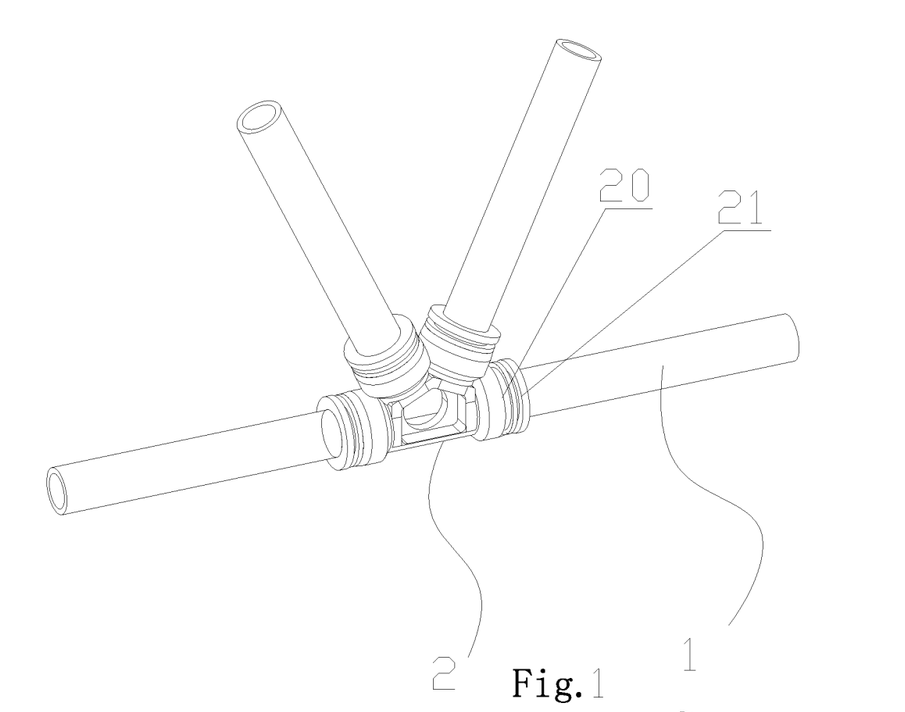
FIG. 1 is a combined structural diagram of a support rod and a connecting member of the present utility model.
Figure 2:
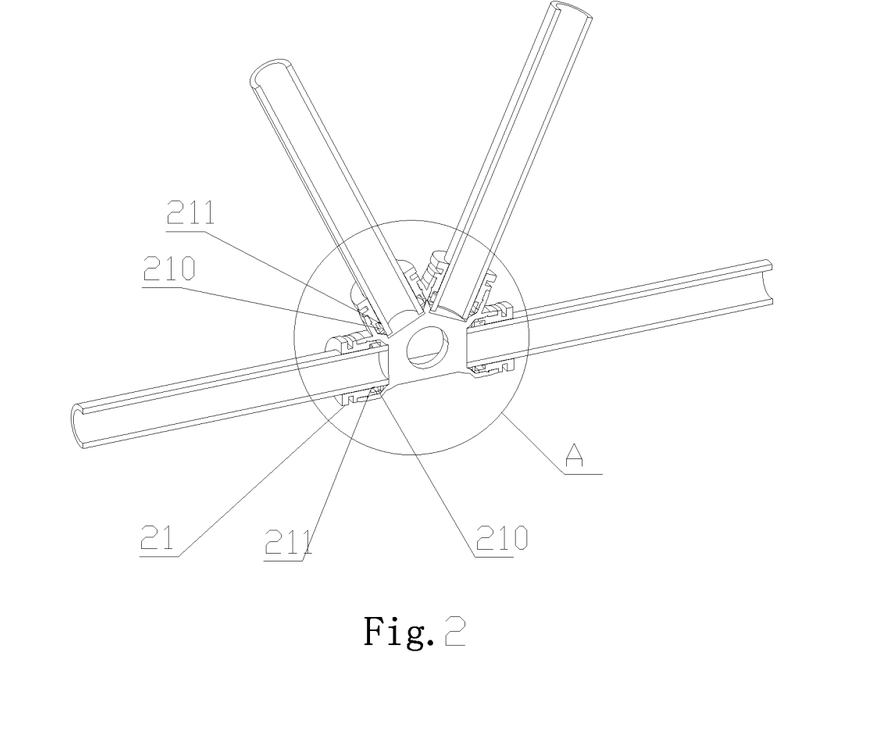
FIG. 2 is a cross-sectional view of a combined structure of a support rod and a connecting member of the present utility model.
Figure 13:
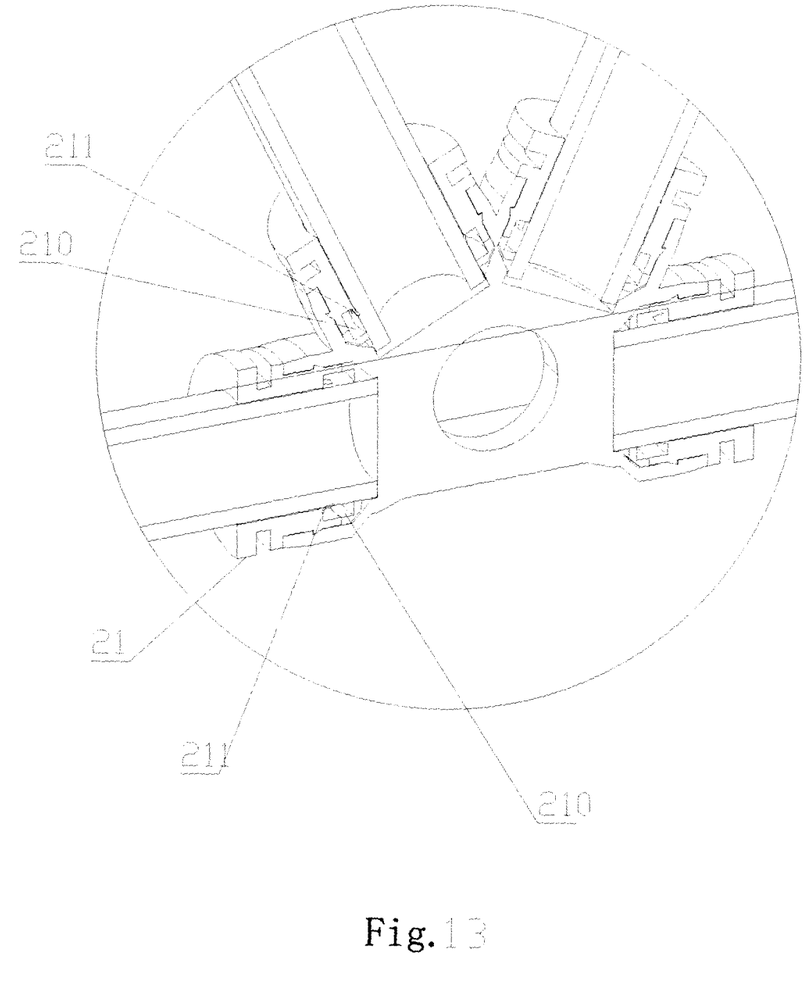
FIG. 13 is a cross-sectional view for enlarging portion A of FIG. 2.
Figure 14:
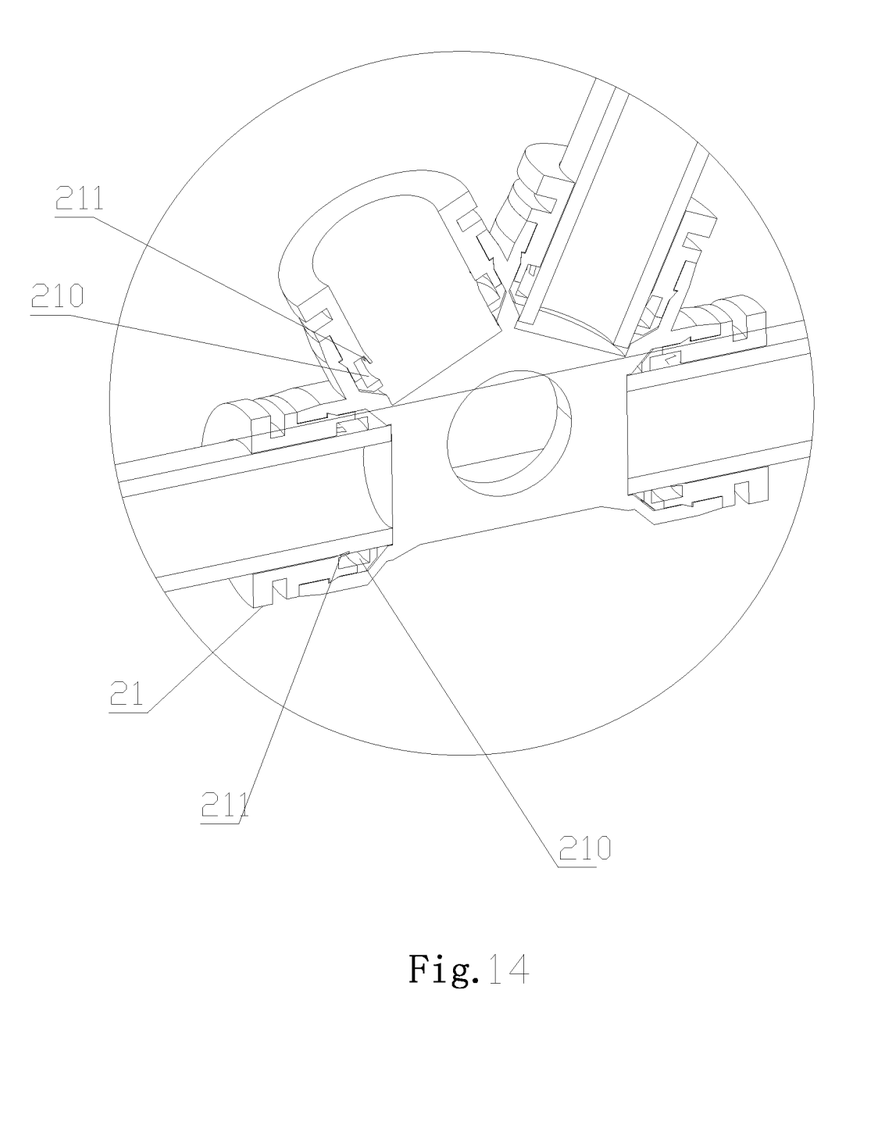
FIG. 14 is a cross-section view for enlarging portion A of FIG. 2, removing one support rod from the socket.

Referring to FIG. 1 and FIG. 2, the present utility model comprises a plurality of support rods 1 and a plurality of connecting members 2, wherein each of the connecting members 2 is provided with at least two connectors 20 and each of the connectors 20 is axially embedded with a socket 21; wherein an annular groove 210 is provided in a position of the inner wall of the socket 21 close to the bottom, and a plurality of elastic pieces 211 are respectively disposed in the annular grooves 210; one end of each of the support rods 1 is inserted into the socket 21 to form a hemispherical frame put up with triangles as a unit and the connecting member 2 as a vertex. FIG. 13 illustrates an enlarged view for the portion where the support rod 1 are inserted to the socket 21. FIG. 14 illustrates an enlarged view for the portion where one of the support rods 1 is removed from the socket 21.

Figure 3:
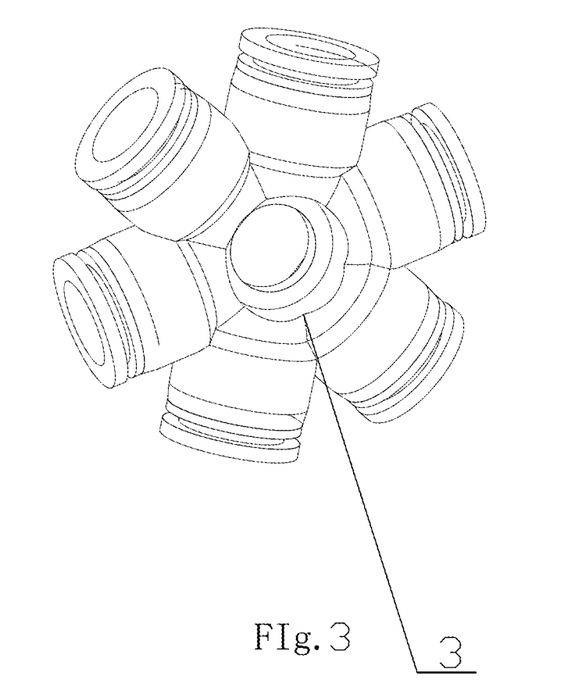
FIG. 3 is a schematic structural view of a regular six-head connecting member in the present utility model.

Referring to FIG. 3, the connecting member comprises a regular six-head connecting member, the regular six-head connecting member comprising a regular hexagonal central base 3, and the connectors 20 being respectively fixed to each side of the central base and being radially distributed.

Figure 4:
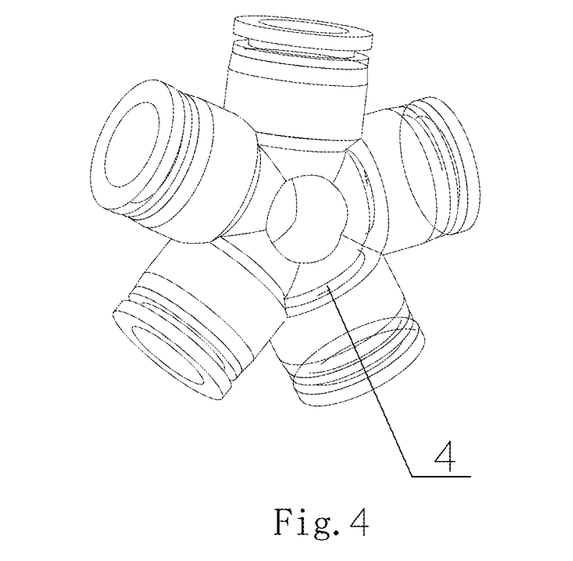
FIG. 4 is a schematic structural view of a regular five-head connecting member in the present utility model.

Referring to FIG. 4, the connecting member comprises a regular five-head connecting member, the regular five-head connecting member comprising a regular pentagonal central base, the connectors 20 being respectively fixed to each side of the central base and being radially distributed.

Figure 5:
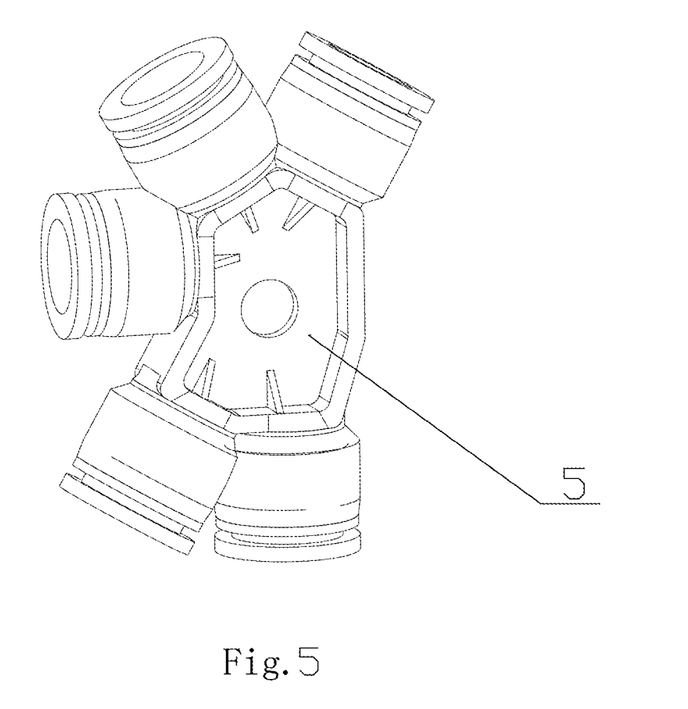
FIG. 5 is a schematic structural view of a partial five-head connecting member in the present utility model.

Referring to FIG. 5, the connecting member comprises a flat five-head connecting member the partial five-head connecting member comprising a flat polygonal central base 5, and the connectors 20 being respectively fixed to the side of the central base and being radially distributed; and an angle between a pair of two adjacent connectors being an obtuse angle.

Figure 6:
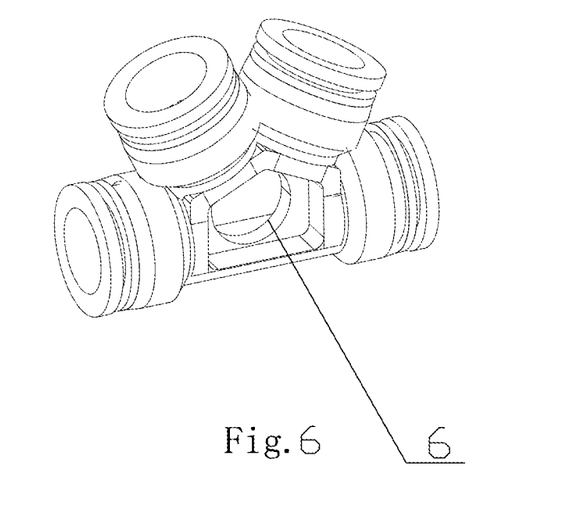
FIG. 6 is a schematic structural view of a first four-head connecting member in the present utility model.

Referring to FIG. 6, the connecting member comprises a first four-head connecting member, the first four-head connecting member comprises a flat pentagonal central base 6 having two right angles, and the connectors 20 being respectively fixed to the side of the central base and being radially distributed; wherein two of the connectors being respectively located on two parallel faces of the central base and on the same axis, and the remaining two connectors being respectively fixed on two inclined faces of the central base.

Figure 7:
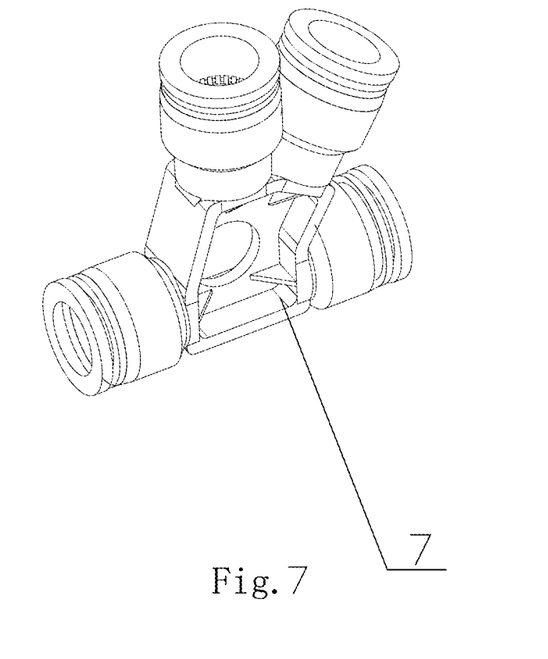
FIG. 7 is a schematic structural view of a second four-head connecting member in the present utility model.

Referring to FIG. 7, the connecting member comprises a second four-head connecting member, and the second four-head connecting member comprises a square pentagonal central base 7, wherein two of the connectors being respectively located on two parallel sides of the central base and on the same axis, and the remaining two connectors being located on the top surface of the central base.

Figure 8:
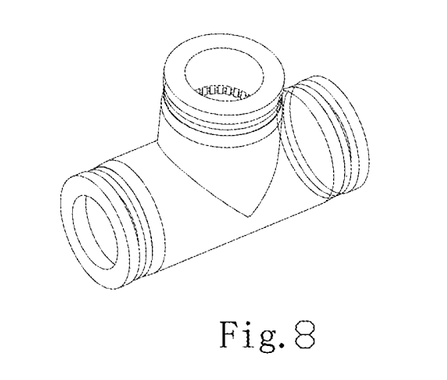
FIG. 8 is a schematic structural view of a regular three-head connecting member in the present utility model.

Referring to FIG. 8, the connecting member comprises a regular three-head connecting member, the three connectors 20 of the regular three-head connecting member are connected to each other in a T-shape as a whole.

Figure 9:
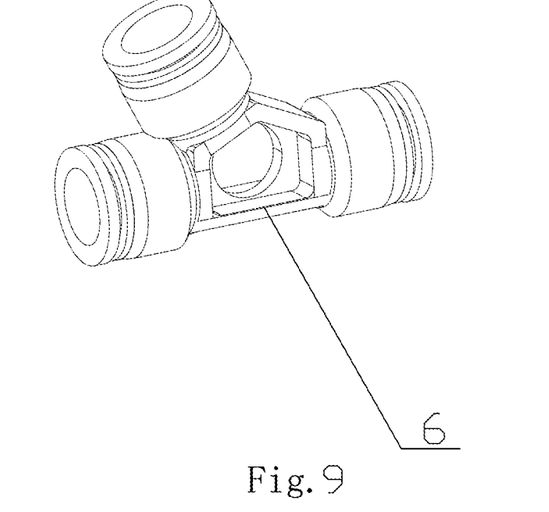
FIG. 9 is a schematic structural view of a partial three-head connecting member in the present utility model.

Referring to FIG. 9, the connecting member comprises a partial three-head connecting member the partial three-head connecting member comprises a flat pentagonal central base having two right angles, and the connectors 20 being respectively fixed to the side of the central base and being radially distributed; wherein two of the connectors being respectively located on two parallel faces of the central base and on the same axis, and the remaining one connector being on one of the inclined faces of the central base such that the entire three-terminal connecting piece is in a beveled triangle shape.

Figure 10:
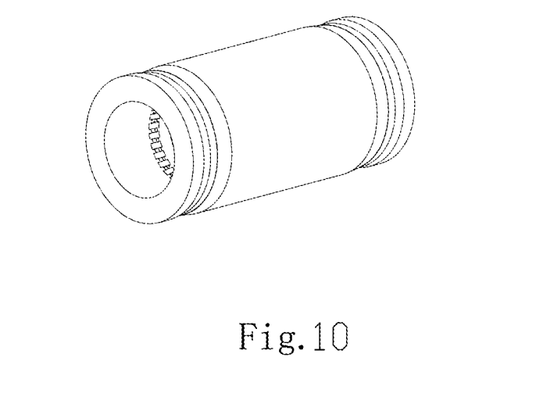
FIG. 10 is a schematic structural view of a two-lead connecting member in the present utility model.

Referring to FIG. 10, the connecting member comprises a two-head connecting member, the two connectors of the two-head connecting member being coaxially connected to each other in a straight line.

When setting up, as the two-head connecting member, partial three-head connecting member regular three-head connecting member, first four-head connecting member, and second four-head connecting member have a coaxial connector, they can be used to construct the bottom side of a tent frame. The ends of the support rods are surrounded to form a ring-shape base by inserting the coaxial connectors of these connecting members, and these connecting members are arranged in different positions depending on the angles. The regular six-head connecting members, regular five-head connecting members, and partial five-head connecting members are used to set up the top face and side face of the spherical lent frame.

Figure 11:
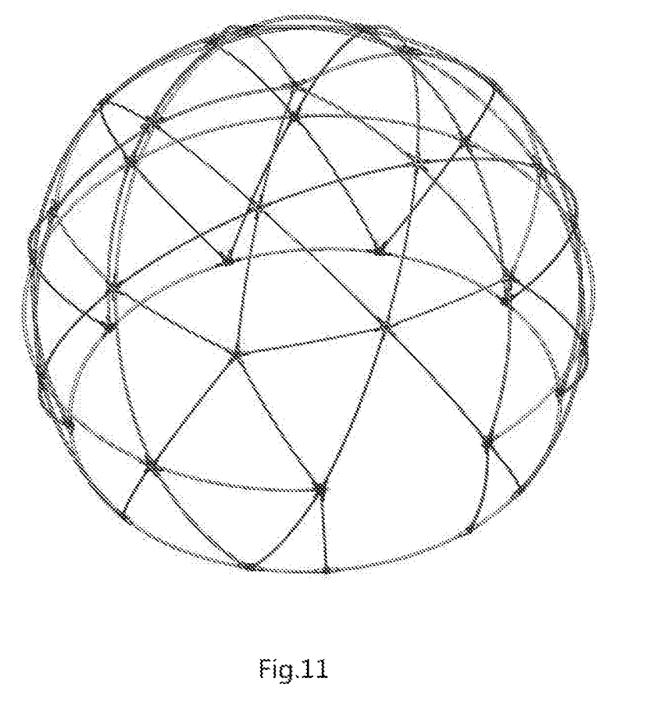
FIG. 11 is a schematic structural view of the first type of spherical tent frame of the present utility model.
Figure 12:
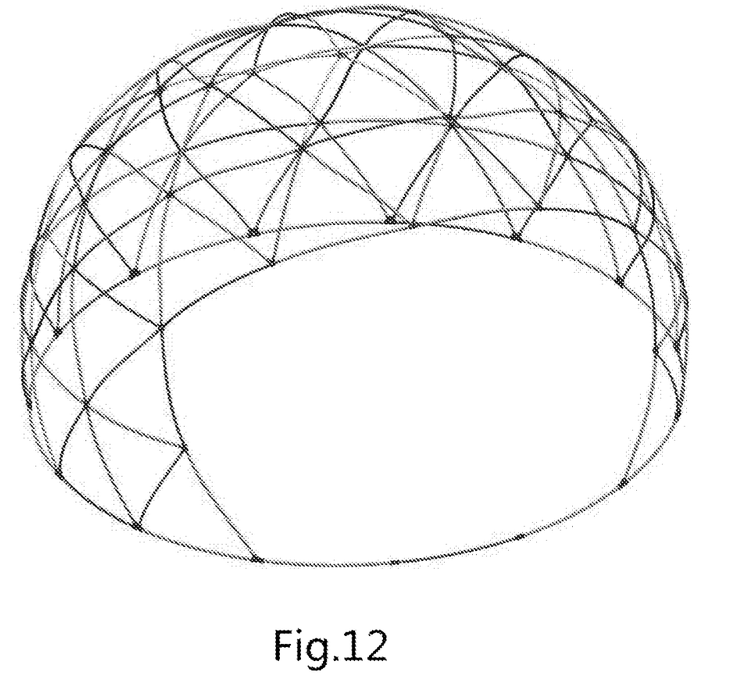
FIG. 12 is a schematic structural view of the second type of spherical tent frame of the present utility model.

FIG. 11 and FIG. 12 show the two types of spherical tent frames of the present utility model. The opening of the frame is in a shape of arcuate arch or apex square.

It should be noted that the above describes an embodiment of the present utility model. However, those skilled in the art should understand that the present utility model is not limited by the above embodiments, and the above described embodiments are merely illustrative of the principles of the present utility model. Variations and modifications can be made to the utility model without departing from the scope of the utility model, and these variations and modifications will fall within the scope of protection of the utility model.

The invention claimed is:

1. A spherical tent frame, comprising a plurality of support rods and a plurality of connecting members, wherein each of the connecting members is provided with at least two connectors and each of the connectors is axially embedded with a socket; wherein an annular groove is provided in a position of an inner wall of the socket close to a bottom of the socket, and a plurality of elastic pieces are respectively disposed in the annular grooves; one end of one of the plurality of support rods is inserted into the socket;

wherein one of the plurality of connecting members comprises a three-head connecting member; the three-head connecting member comprises a flat pentagonal central base having two right angles, and the connectors being respectively fixed to sides of the central base and being radially distributed; wherein two of the connectors being respectively located on two sides of the central base, which are parallel to each other, and on the same axis, and a remaining connector being on one of a plurality of inclined sides of the central base.

2. The spherical tent frame according to claim 1, wherein another of the plurality of connecting members comprises a regular six-head connecting member; the regular six-head connecting member comprising a regular hexagonal central base, and the connectors being respectively fixed to each side of the central base and being radially distributed.

3. The spherical tent frame according to claim 1, wherein another of the plurality of connecting members comprises a regular five-head connecting member; the regular five-head connecting member comprising a regular pentagonal central base, the connectors being respectively fixed to each side of the central base and being radially distributed.

4. The spherical tent frame according to claim 1, wherein another of the plurality of connecting members comprises a five-head connecting member; the five-head connecting member comprising a polygonal central base, and the connectors being respectively fixed to sides of the central base and being radially distributed; and one angle of the multiple angles between adjacent connectors being obtuse.

5. The spherical tent frame according to claim 1, wherein another of the plurality of connecting members comprises a four-head connecting member; the four-head connecting member comprises a flat pentagonal central base having two right angles, and the connectors being respectively fixed to sides of the central base and being radially distributed; wherein two of the connectors being respectively located on two of the sides of the central base, which are parallel to each other, and on the same axis, and a remaining two of the connectors being respectively fixed on two of the sides of the central base, which are angled relative to each other.

6. The spherical tent frame according to claim 1, wherein another of the plurality of connecting member comprises a four-head connecting member; and the four-head connecting member comprises a central base, wherein two of the connectors being respectively located on two sides of the central base, which are parallel to each other, and on the same axis, and a remaining two of the connectors being located on a top surface of the central base.

7. The spherical tent frame according to claim 1, wherein another of the plurality of connecting member comprises a regular three-head connecting member; wherein the regular three-head connecting member comprises three connectors which are connected to each other in a T-shape.

8. The spherical tent frame according to claim 1, wherein another of the plurality of connecting members comprises a two-head connecting member; wherein the two-head connecting member comprises two connectors which are coaxially connected to each other in a straight line.

9. The spherical tent frame according to claim 1, wherein an opening of the frame is in a shape of arcuate arch or apex square.

* * * * *